(No Model.)
G. H. TIETJEN.
SIGN STENCILING MACHINE.
No. 477,474. Patented June 21, 1892.
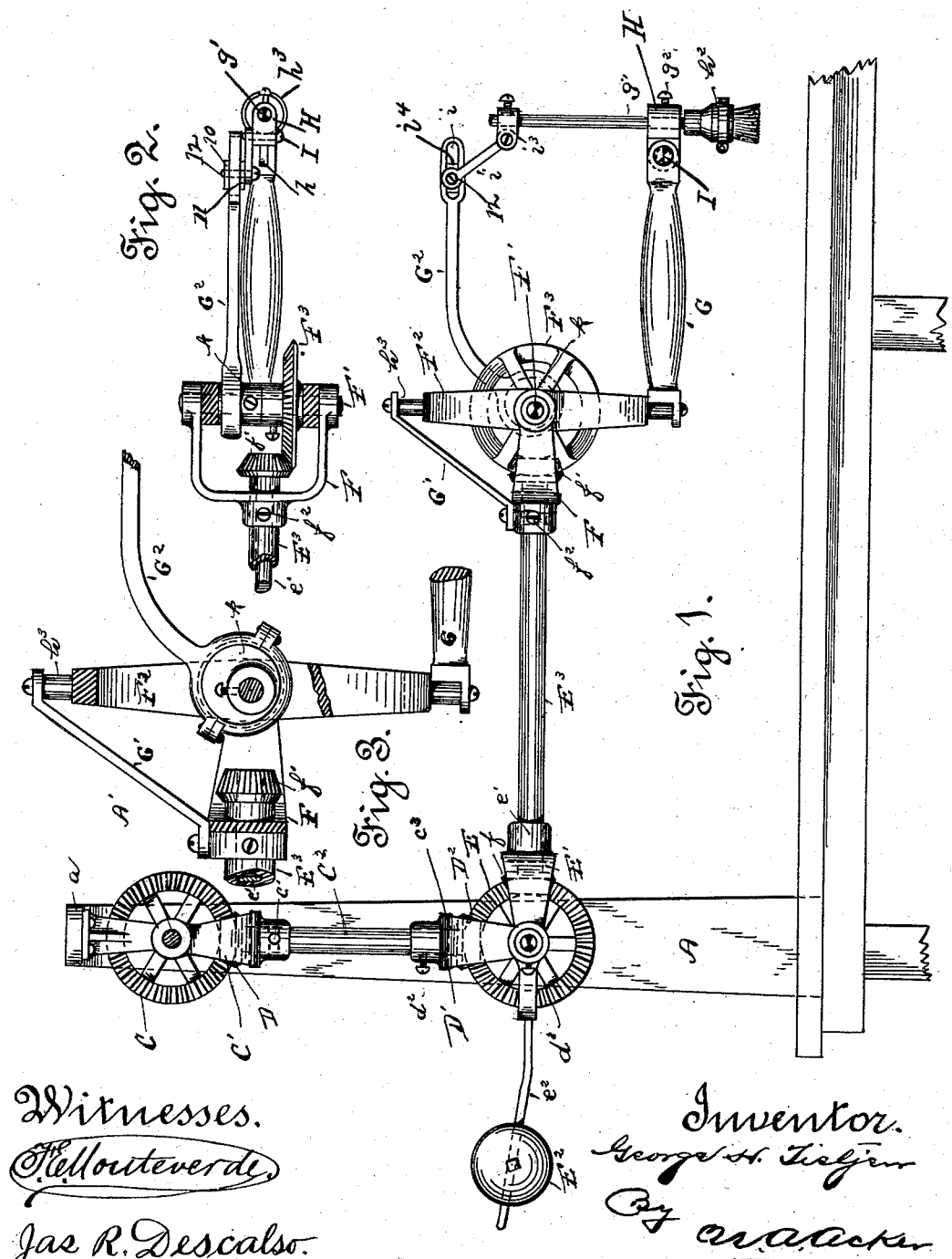
Witnesses.
F. Monteverde
Jas. R. Descalso.
Inventor.
George H. Tietjen
By W. A. Acker
Atty.

UNITED STATES PATENT OFFICE.

GEORGE H. TIETJEN, OF SAN FRANCISCO, CALIFORNIA, ASSIGNOR TO THE TIETJEN SIGN COMPANY, OF SAME PLACE.

SIGN-STENCILING MACHINE.

SPECIFICATION forming part of Letters Patent No. 477,474, dated June 21, 1892.

Application filed May 26, 1891. Serial No. 394,170. (No model.)

*To all whom it may concern:*

Be it known that I, GEORGE H. TIETJEN, a citizen of the United States, residing at San Francisco, in the county of San Francisco and State of California, have invented certain new and useful Improvements in Sign-Stenciling Machines; and I do hereby declare the following to be a full, clear, and exact description of said invention, such as will enable others skilled in the art to which it most nearly appertains to make, use, and practice the same.

This invention relates to division of application filed by me on the 22d day of May, 1890, for certain new and useful improvements in sign-stenciling machines, which application bears Serial No. 350,306.

The present invention relates to the mechanism whereby a reciprocating motion may be imparted to the stenciling-machine, fully set forth and described in the above-mentioned application, which consists of the parts and details of construction, as will be hereinafter more fully set forth in the drawings, described, and pointed out in the specification.

Referring to the drawings forming a part of this specification, wherein similar letters of reference are used to denote corresponding parts throughout the entire specification, Figure 1 is a side view in elevation; Fig. 2, a detail top plan of the brush-operating mechanism; and Fig. 3, detail in elevation, partly broken away, of Fig. 2.

The letter A is used to indicate the frame of my machine, which is provided with the forwardly-extending arm $a$, and the letter A' represents the operating-axle, which is secured and works within bearings formed within the frame, and downwardly-extending arms, fully set forth in application, Serial No. 350,306. Said axle is operated by means of any suitable machinery acting upon drive-wheel (not shown) secured to outer end thereof. I secure upon said axle rigidly, between the downwardly-extending arms, the bevel-wheel C, which works within yoke C', depending from the operating, axle A'. To said yoke is movably secured the downwardly-extending sleeve $C^2$ by means of the lug or screw $c'$. The upper end of said sleeve is provided with the annular groove, (shown in dotted lines,) within which the screw or lug $c'$ enters, and through this sleeve works the operating-rod $c^3$, to the upper and lower end of which are rigidly attached pinions D D', (shown in dotted lines, Fig. 1,) the upper one of which meshes with the bevel-wheel C. It will thus be seen that by providing the upper end of sleeve $C^2$ with an annular groove, within which screw $c'$ engages I provide virtually a universal movement thereof. To the lower end of said sleeve I rigidly attach the supporting-yoke $D^2$ by means of screw $d^2$. The lower end of the supporting-yoke arms form bearings, through which axle $d^3$ passes. Upon this axle I locate the bevel-wheel E, which engages or meshes with pinion D', and upon the outer ends of said axle $d^3$ I mount the swinging bracket E'. From the rear of this bracket extends rod $e^2$, which is provided with the adjustable counterbalance-weight $e^2$. Attached to and extending forwardly from said swinging supporting-bracket E' is the sleeve $E^3$, within which operates the rod $e'$. To the forward and rear end of said rod I rigidly secure the pinions $f f'$ by means of screws. (Not shown.) The pinion $f$ meshes with bevel-gear E, mounted upon the axle $d^3$. To the outer end of the sleeve $E^3$, I attach the bracket or yoke F by means of the screw $f^2$, which works within an annular groove, (shown in dotted lines,) similar to that formed in the upper end of sleeve $C^2$. Thus I provide for the easy turning or movement of the yoke upon the sleeve. The outer ends of the yoke-arms form bearing for the axle F', upon which works the holder $F^2$. Upon said axle I locate the bevel-gear $F^3$, which meshes with pinion $f'$, secured to the outer end of rod $e'$. To the lower end of support $F^2$ is bolted handle G, within the outer end of which the brush-rod $g'$ is secured by means of screw $g^2$, and thereto is fastened the stenciling-brush through the medium of clamp $h^2$. The tool holder or support $F^2$ is held in an adjusted position by means of brace G', which is bolted to end $h^3$ and sleeve $E^3$. Upon the axle F', I locate the eccentric $k$, upon which I secure the outwardly-extending strap $G^2$. The outer end of said strap is provided with an elongated slot $i$, which receives a set-block 14, said set-block being suitably secured at any desired point of the slot to regulate the throw of the brush. To this set-block I pivot the upper end of a connecting-bar $i'$. The lower end of said bar is secured to the collar $i^3$, which is attached to the upper end of the rod $g$. It will be observed from the plan view, Fig. 2, that the handle G is provided with an open-ended recess, which receives the tongue $h$ of a bearing-block H, said tongue being pivoted therein by means of a transverse bolt I. The operating-rod $g'$ of the brush passes through an aperture therefor in the bearing-block and is held in place by means of the screw $g^2$, as above described. By means of the elongated slot I am enabled to regulate the throw of the stenciling-brush. The connecting-bar $i'$ is pivoted to the set-block by a screw or bolt 12, which passes through the end of the bar and the block. On the said screw or bolt I mount the nuts 10 11, which bear against the sides of the strap $G^2$, and when turned home clamp the said strap, so as to hold the set-block in its adjusted position. The upper end of the bar $i'$ is mounted loosely on the screw between the head of the same and the nut 11, so that turning the nuts home does not affect the said bar. The working of the device when used to give a reciprocating motion to the brush is the same as that employed in order to impart a rotary motion, which is fully set forth in application Serial No. 350,306. The eccentric revolving with the rotating axle F' causes the reciprocation of strap $G^2$, which, through the medium of the connecting-rod $i'$, transmits the same to the operating-rod $g'$. As the operating-rod is thus removed, it of course has the effect of turning the bearing-block H on its pivot. An up-and-down and sidewise motion is thereby imparted to the stenciling-brush with the result of effectually spreading the paint. This movement of the brush will be found of great advantage when it is desired to place the paint heavily upon the sign in order to permit of sanding, which result cannot be effected by the rotary movement of the brush, inasmuch as the paint is placed upon the sign too thin to permit of sanding.

I am aware that minor changes may be made in the arrangement of parts and details of construction herein shown and described without causing or necessitating a departure from the nature and scope of my invention.

Having thus described my invention, what I claim as new, and desire to secure protection in by Letters Patent of the United States, is—

1. In a sign-stenciling machine, the combination, with the eccentric and mechanisms for imparting motion to the eccentric, of the stenciling-brush suitably connected thereto and adapted by the throw thereof to have a reciprocating motion imparted thereto, as and for the purpose set forth.

2. In a sign-stenciling machine, the combination, with the handle-support, operating-handle, eccentric mounted thereon, and mechanism for imparting motion thereto, of the stenciling-brush suitably connected thereto and adapted to have a reciprocating motion imparted by the throw of the eccentric, as and for the purpose set forth.

3. The combination of a rotatable rod, a transverse shaft having an eccentric mounted thereon and also provided with a bevel-gear meshing with a pinion upon the end of the rotatable rod, and a stenciling-brush constructed to be operated by the eccentric and to have a horizontal reciprocating motion imparted thereto, substantially as set forth.

4. In a sign-stenciling machine, the combination, with the eccentric, of the forwardly-extending strap passing therearound, provided with an elongated slot in its outer end for regulating the throw of the stencil-brush, and means for rotating the eccentric, substantially as set forth.

5. In a stenciling-machine of the herein-described nature, the combination, with the forwardly-extending sleeve carrying an operating-rod provided with pinions, of the yoke attached to the forward end axle, having bearings in the arms thereof, gear located thereon and adapted to mesh with the forward pinion of the operating-rod, supporting holder or bracket secured thereon, eccentric mounted upon said axle and adapted to revolve therewith, forwardly-extending strap passing around the eccentric, brace rigidly securing said holder upon the forward end of the sleeve, forwardly-extending handle attached to the holder, operating-rod secured movably to the outer end of the handle, connecting-rod connecting the upper end of said operating-rod to the outer end of the eccentric-strap, and the stencil-brush secured to the operating-rod, substantially as set forth and described.

6. In a stenciling-machine, the combination of an eccentric, a forwardly-extending strap passing therearound, a handle provided with a recess, a bearing-block having a tongue pivoted in said recess, an operating-rod passing through the bearing-block and provided with a brush at its lower end, and a link connecting the end of the forwardly-extending strap with the upper end of the operating-rod.

In testimony whereof I affix my signature in presence of two witnesses.

GEORGE H. TIETJEN.

Witnesses:
N. A. ACKER,
JNO. F. UHLHORN.